(12) United States Patent
Hedelin

(10) Patent No.: US 6,478,006 B1
(45) Date of Patent: Nov. 12, 2002

(54) WORKING CYCLE FOR A HEAT ENGINE, ESPECIALLY AN INTERNAL COMBUSTION ENGINE, AND AN INTERNAL COMBUSTION ENGINE

(76) Inventor: Lars G. Hedelin, Skärsnäsvägen 5, SE-182 63 Djursholm (SE)

( * ) Notice: Subject to any disclaimer, the term of this patent is extended or adjusted under 35 U.S.C. 154(b) by 0 days.

(21) Appl. No.: 09/614,685

(22) Filed: Jul. 12, 2000

(51) Int. Cl.⁷ .............................................. F02B 19/00
(52) U.S. Cl. ........................ 123/259; 123/279; 123/285
(58) Field of Search ................................ 123/253, 257, 123/259, 260, 261, 268, 270, 279, 281, 284, 285, 286, 41.84

(56) References Cited

U.S. PATENT DOCUMENTS

| | | | | |
|---|---|---|---|---|
| 1,708,056 A | * | 4/1929 | French | 123/276 |
| 1,816,432 A | * | 7/1931 | Hill | 123/188.5 |
| 4,170,966 A | * | 10/1979 | Schmidt | 123/279 |
| 4,235,203 A | | 11/1980 | Thery | |
| 4,465,033 A | * | 8/1984 | Blaser | 123/193.4 |
| 4,485,779 A | * | 12/1984 | Spurk | 123/193.6 |
| 4,788,942 A | * | 12/1988 | Pouring et al. | 123/219 |
| 4,864,987 A | * | 9/1989 | Kawamura | 123/193.4 |
| 5,025,765 A | | 6/1991 | Kawamura | |
| 5,033,427 A | * | 7/1991 | Kawamura et al. | 123/193.3 |
| 5,076,219 A | * | 12/1991 | Pellerin | 123/190.14 |
| 5,176,839 A | * | 1/1993 | Kim | 249/111 |
| 5,179,839 A | * | 1/1993 | Bland | 123/286 |
| 5,664,541 A | * | 9/1997 | Yoo | 123/275 |
| 6,330,871 B1 | * | 12/2001 | Jufuku et al. | 123/193.3 |

FOREIGN PATENT DOCUMENTS

| | | |
|---|---|---|
| FR | 2 416 344 | 8/1979 |
| WO | WO 99/46492 | 9/1999 |
| WO | WO 99/63206 | 12/1999 |

* cited by examiner

Primary Examiner—Gene Mancene
Assistant Examiner—Arnold Castro
(74) Attorney, Agent, or Firm—Young & Thompson

(57) ABSTRACT

The present invention relates to a working cycle for a heat engine, especially of the reciprocating piston type, having a gas as working medium, including the steps of isentropic compression of the gas, isochoric addition of heat to the gas, isentropic expansion of the gas, and isochoric return of the gas to its initial condition. The invention is characterized in that the gas, before or during the compression, is divided into two portions, that the gas portions are compressed to different degrees, that heat is added only or mainly to the gas portion compressed to the lowest degree, and that the two gas portions are brought into connection with each other and are expanded together.

23 Claims, 18 Drawing Sheets

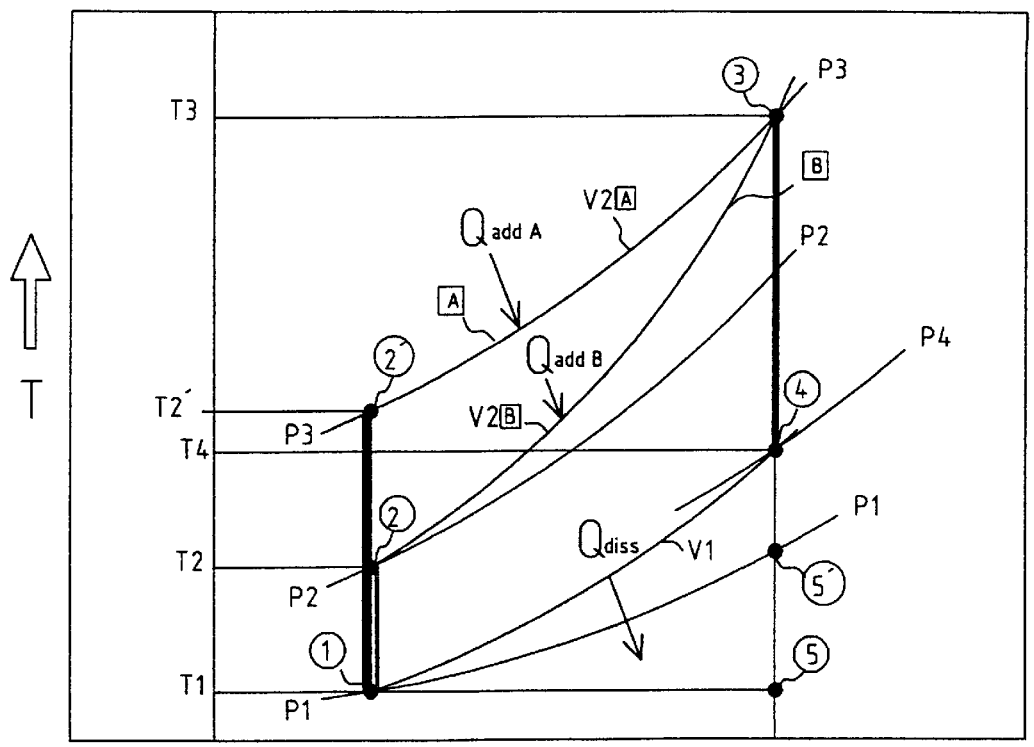
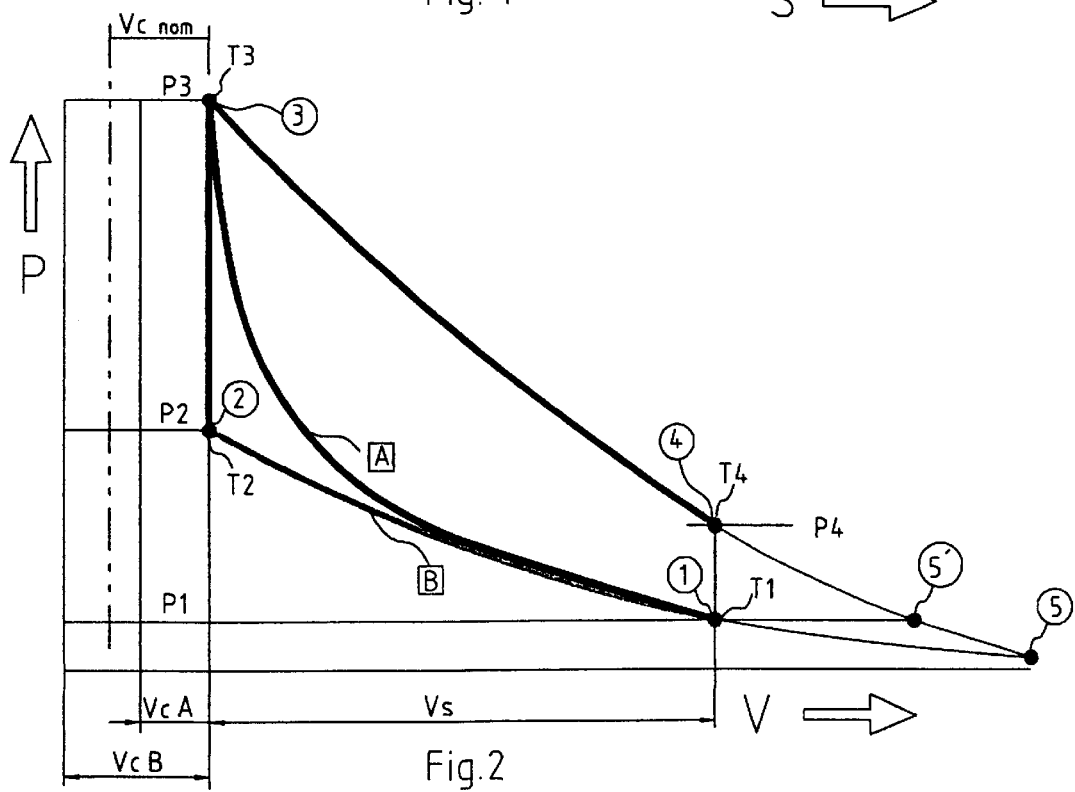

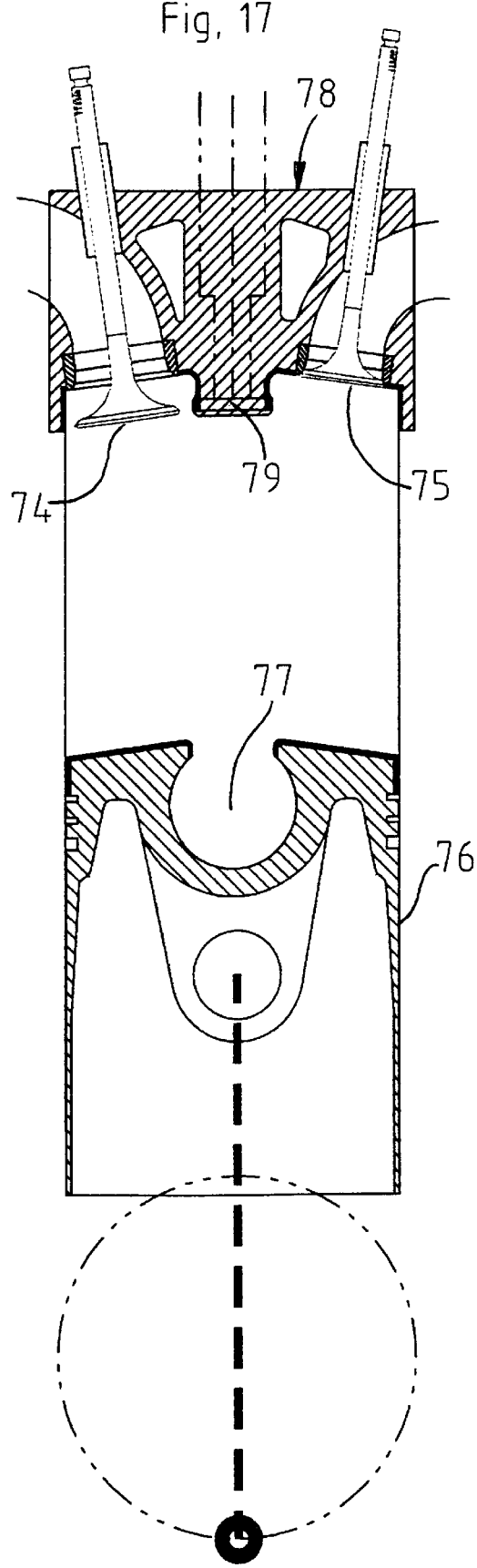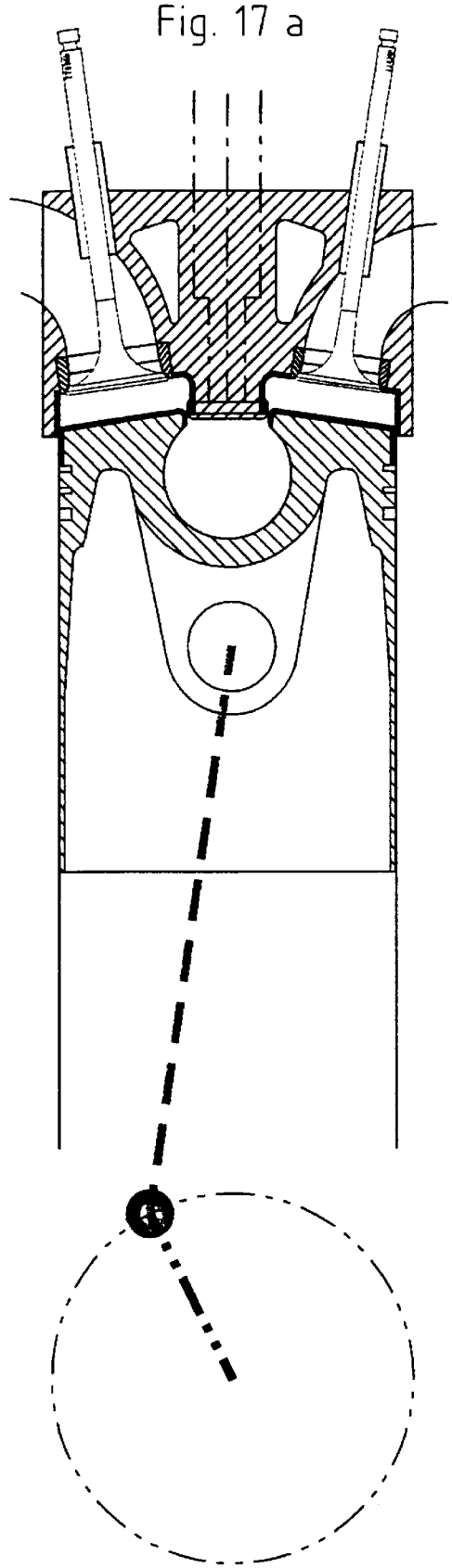

WORKING CYCLE FOR A HEAT ENGINE, ESPECIALLY AN INTERNAL COMBUSTION ENGINE, AND AN INTERNAL COMBUSTION ENGINE

FIELD OF THE INVENTION

The present invention relates to a working cycle for a heat engine, especially an internal combustion engine.

BACKGROUND OF THE INVENTION

Heat engines, e.g. internal combustion engines of the reciprocating piston type, have been used extensively for a long time for driving a wide range of machinery, both stationary, e.g. generators, pumps, and compressors, and movable, e.g. land, sea, and aerial vehicles. In the technology of internal combustion engines the two principal working cycles are the Otto cycle and the Diesel cycle. Both these cycles have been used in both two- and four-stroke variants.

In heat engines of the type referred to above, the principal, ideal working cycle includes isentropic compression of the gas, isochoric addition of heat to the gas, isentropic expansion of the gas, and isochoric return of the gas to its condition at the start of the working cycle.

This ideal cycle is only possible under certain conditions, i.e. the working medium is an ideal gas having constant specific heats $c_p$, $c_v$, there are no heat, gas or flow losses, the addition and dissipation of heat is instantaneous, and there is no residual gas.

In the internal combustion engine technology it is desirable to achieve as high efficiency as possible, and this is true for both the mechanical and the thermal efficiency. There are many reasons for this, and among these there is a desire to reduce the fuel consumption of the engine, and thereby to reduce the operation costs, and also a desire to reduce the emission of harmful residues from the combustion to the environment.

One way to increase the thermal efficiency of an internal combustion engine is, as can be seen above, to raise the compression ratio of the engine. However, there are certain limitations to this, because a high compression ratio gives a high pressure in the combustion chamber in the cylinder or cylinders of the engine at the end of the compression. During combustion, the stresses of the engine, especially the moving parts, then become very high. In order to get sufficient strength, the dimensions of the parts have to be increased, which means increased weight and increased internal friction and lowers the mechanical efficiency. High pressures also lead to problems regarding control of the ignition of the fuel, and this is particularly the case for spark ignition engines, i.e. engines working according to the Otto working cycle, but also compression ignition engines, i.e. engines working according to the Diesel working cycle, will encounter problems if the pressure in the combustion chamber is very high at the end of the compression.

SUMMARY OF THE INVENTION

An object of the present invention is to provide a working cycle for a heat engine, said working cycle enabling an increase in the thermal efficiency of the engine in comparison to previously known heat engines.

Another object of the present invention is to provide a working cycle for an internal combustion engine of the reciprocating piston type, said working cycle enabling an increase of the thermal efficiency of the engine in comparison to a conventional engine, said working cycle being applicable to both spark ignition and compression ignition engines of both two- and four-stroke types.

This is achieved by a working cycle as defined above.

Another object of the present invention is to provide an internal combustion engine having increased thermal efficiency compared to a conventional engine, said engine of the present invention being either a spark ignition or a compression ignition engine of the two- or four-stroke type.

This is achieved by an internal combustion engine of the initially defined type.

Preferable embodiments of the working cycle and the engine are defined in the depending claims.

DESCRIPTION OF THE DRAWINGS

The invention will be described in more detail below with reference to the enclosed drawings, in which FIG. 1 is a temperature-entropy diagram for the working cycle according to the invention, FIG. 2 is a pressure-volume diagram for a working cycle according to FIG. 1, FIG. 3a–e are highly schematic longitudinal sections through an engine working according to the working cycle of the present invention in various stages of the working cycle, FIG. 14a shows a section along the line XIV—XIV in FIG. 14, FIG. 14b shows an enlarged section of a part of the engine according to FIG. 14, with the piston approx. 10 crankshaft degrees before top dead centre position, FIG. 16a is an enlarged view of the marked area in FIG. 16, FIGS. 17, 17*a* show sections through a four-stroke engine according to a further modified embodiment of the present invention in positions at the beginning and towards the end of the compression stroke, respectively.

DETAILED DESCRIPTION OF PREFERRED EMBODIMENTS

Figure 3:
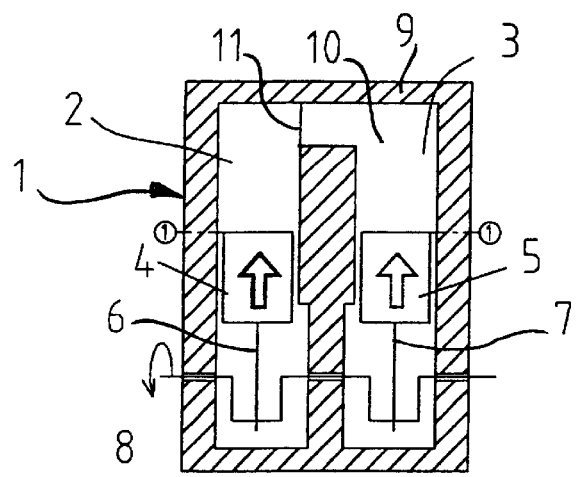
Figure 3:
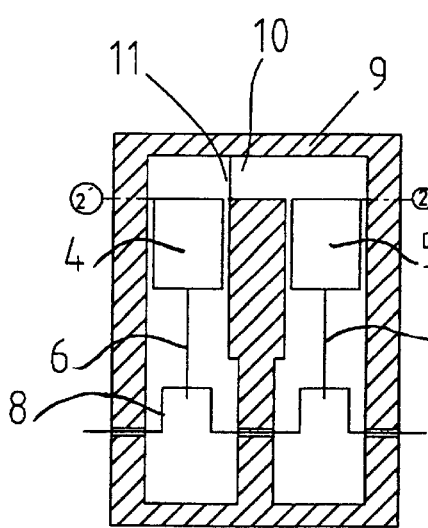
Figure 3:
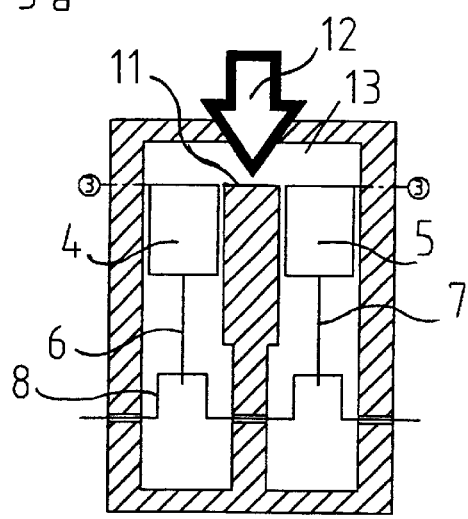
Figure 3:
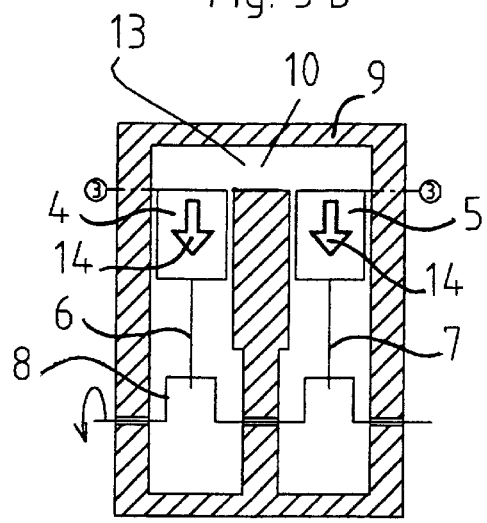
Figure 3:
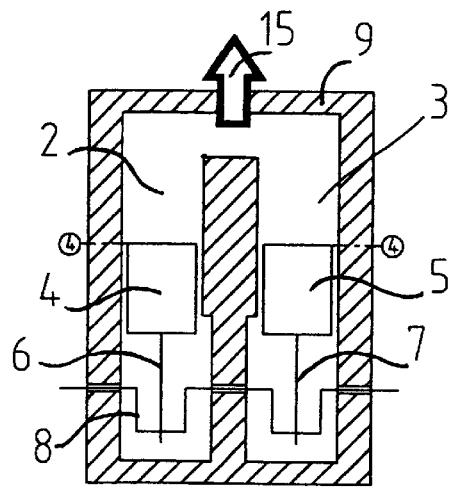

Reference will first be made to FIGS. 1–3, which relate to a mostly theoretical aspect of the invention. FIG. 1 shows a temperature-entropy diagram of a working cycle according to the invention. The curves marked A and B, respectively, refer to part processes performed in different parts of an internal combustion engine, as will be described in more detail below. The numbers in circles denote specific points and are used as indexes in the description below.

As can be seen from FIGS. 1 and 2, the process A includes a compression from point 1 to point 3 including addition of compression heat $Q_{addA}$, whereas the process B includes a compression from point 1 to point 2, which is considerably less than the compression according to process A. Thereafter, the process B includes an increase in pressure by addition of heat $Q_{addB}$, so that the processes A and B meet at the point 3. From that point there is a common expansion to point 4, where the remaining heat $Q_{diss}$ is dissipated from point 4 to point 1, whereupon the processes start all over again.

The thermal efficiency of the working cycle described above, as of all heat engines, is calculated as $\eta_{th}=(Q_{add}-Q_{diss})/Q_{add}$, where $Q_{add}$=added heat=m $c_v(T_3-T_2)$ and $Q_{diss}$=dissipated heat=m $c_v(T_4-T_1)$. Therefore, $\eta_{th}=1-(T_4-T_1)/(T_3-T_2)=1-T_1/T_2$. The index numbers correspond to the conditions in the specific points in FIGS. 1 and 2 as mentioned above. If $T_1/T_2=\epsilon^{k-1}$, we will arrive at the $\eta_{th}=1-\epsilon^{k-1}$, we will arrive at $\eta_{th}=1-\epsilon^{k-1}$, where the compression ratio is defined as $\epsilon=(V_c+V_s)/V_c$, where $V_c$ is the compression volume and $V_s$ is the displacement of the engine. This means that for the working cycle described above, $\epsilon=(V_{cA}+V_{cB}+V_{sA}+V_{sB})/(V_{cA}+V_{cB})$, where the indexes A and B refer to processes A and B, respectively, as described above.

In FIGS. 3*a*–*e*, there is shown very schematically the sequence of the working cycle according to the present invention. Starting in FIG. 3*a*, there is shown a heat engine in the form of a very schematic internal combustion engine 1 having two cylinders 2 and 3, in which pistons 4 and 5, respectively, are movable in an upward and downward direction. The pistons 4, 5 are by means of connecting rods 6 and 7, respectively, connected to a crankshaft 8 in the lower part of the engine. A cylinder head 9 is shown closing off the upper portion of cylinders 2, 3. There is also a connection channel 10 between the cylinders 2, 3, and a flap or valve 11, which is able to open or close the connection channel 10.

In the position illustrated in FIG. 3*a*, the pistons 4, 5 are shown as they start their movement upwards in cylinders 2, 3, respectively. As soon as the pistons 4, 5 move upwardly a compression stroke starts. The flap 11 is in its closed position, as shown in FIG. 3*b*, so that the connection channel 10 is closed. The gas enclosed in cylinder 2 above piston 4 will be compressed separately from the gas enclosed in the cylinder 3 above piston 5. As can be seen in FIG. 3*b*, the two masses of gas in the cylinders 2, 3 will be compressed differently. The compression ratio in cylinder 2 will be substantially higher than the compression ratio of the gas in cylinder 3, as can be seen in FIG. 3*c*, i.e. the compression volume $V_{cB}$ in cylinder 2 is smaller than the compression volume $V_{cA}$ in cylinder 3.

In the position indicated in FIG. 3*c*, the pistons 4, 5 are situated at their top dead centres in cylinders 2, 3, respectively. The flap 11 is opened and heat is added, as indicated by the arrow 12. This means that the temperature and the pressure in the compression chamber 13 formed by the two volumes $V_{cA}$ and $V_{cB}$ increase substantially. The pistons 4, 5 will start their downward movement under the influence of the entalphy of the gas in the compression chamber 13. This is indicated by the arrows 14 in FIG. 3*d*. The movement of the pistons 4, 5 is transmitted through the connecting rods 6, 7 to the crank shaft 8.

When the pistons 4, 5 reach the position illustrated in FIG. 3*e*, heat is dissipated, as indicated by the arrow 15, whereafter the situation is the same as in FIG. 3*a*.

The description above with reference to FIGS. 3*a*–*e* is mainly theoretical and has therefore been illustrated by sections through an engine, which is shown very schematically and only with the parts necessary for an understanding of the invention.

Reference will then be made to FIGS. 4–8, which relate to a second embodiment of the working cycle according to the invention. This embodiment is also mostly theoretical, and the engine shown in FIG. 8*a*–*e* is very schematically illustrated. In FIGS. 4–8, the same reference numerals are used as in FIGS. 1–3, with reference numerals added for elements not having any correspondence in FIGS. 1–3.

Figure 4:
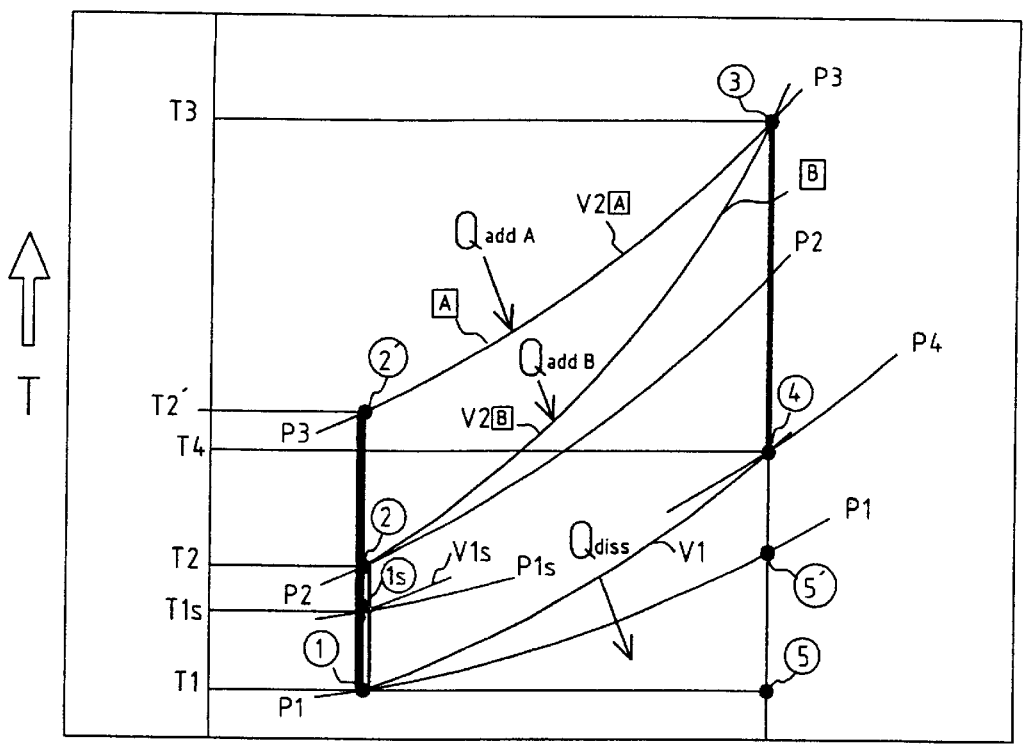
FIG. 4 is a temperature-entropy diagram for a working cycle according to a second embodiment of the invention.
Figure 5:
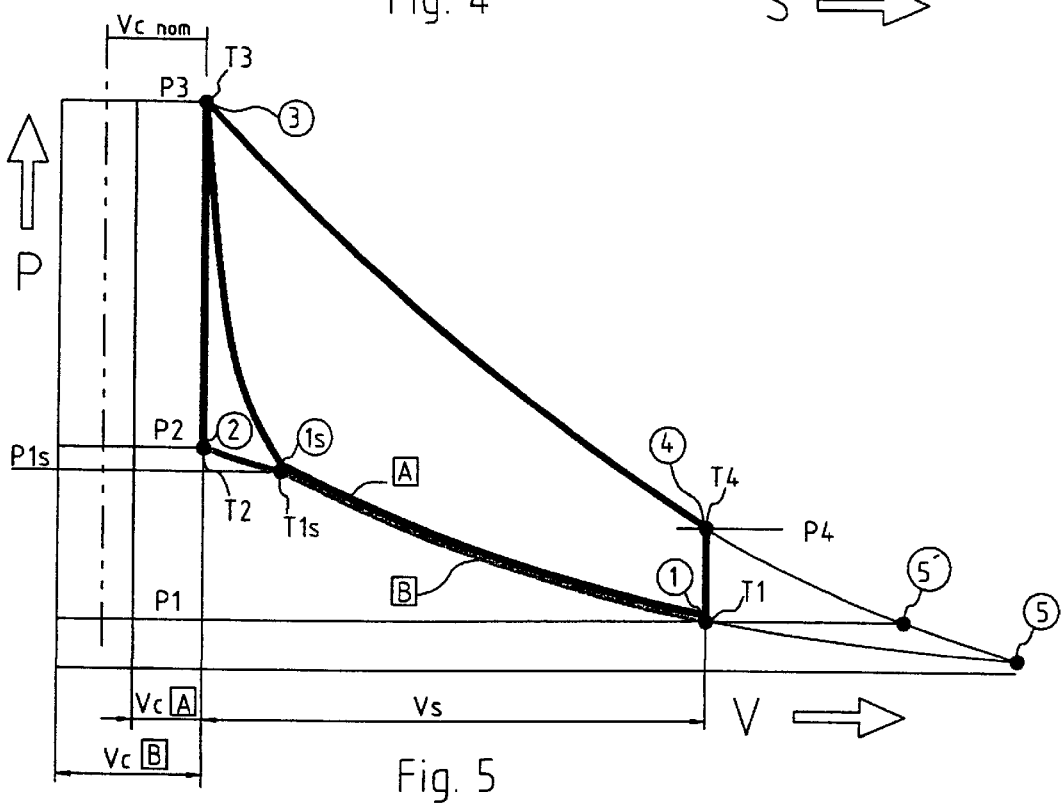
FIG. 5 is a pressure-volume diagram for the working cycle according to the second embodiment of the invention.
Figure 6:
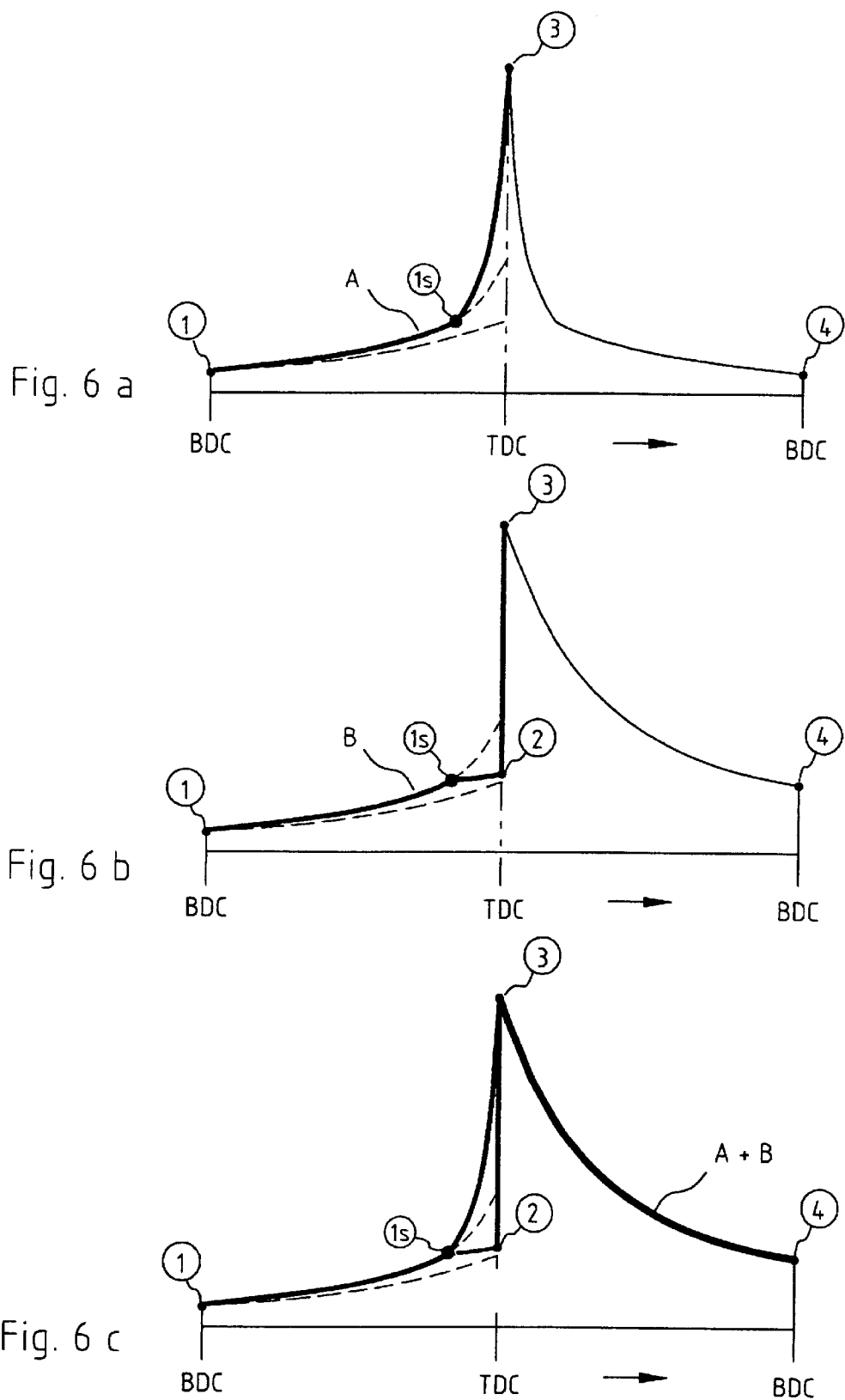
FIG. 6a–c show diagrams of pressure vs. crankshaft angle for cycle processes A and B and the combined working cycle according to the second embodiment of the present invention.

As can be seen from FIGS. 4 and 5, the process A includes, as before, a compression from point 1 to point 1*s* and further to point 3, whereas the process B includes a compression from point 1 to point 1*s*, and from there to point 2. From point 1 to point 1*s* the two processes A and B are parallel, but from point 1*s* the two processes are separate, and, as can be seen, the compression according to the process B from point 1*s* to point 2 gives a considerably lower compression than the compression according to process A. This means that after point 2, the process B includes an increasing pressure by additional heat, as described above in connection with FIGS. 1–3. From point 3, the processes A and B are performed together as one process in the same manner as described above in connection with FIGS. 1–3.

FIGS. 6*a*–*c* show pressure-piston position diagrams for the process A, the process B and the combination of the two processes, respectively.

Figure 7:
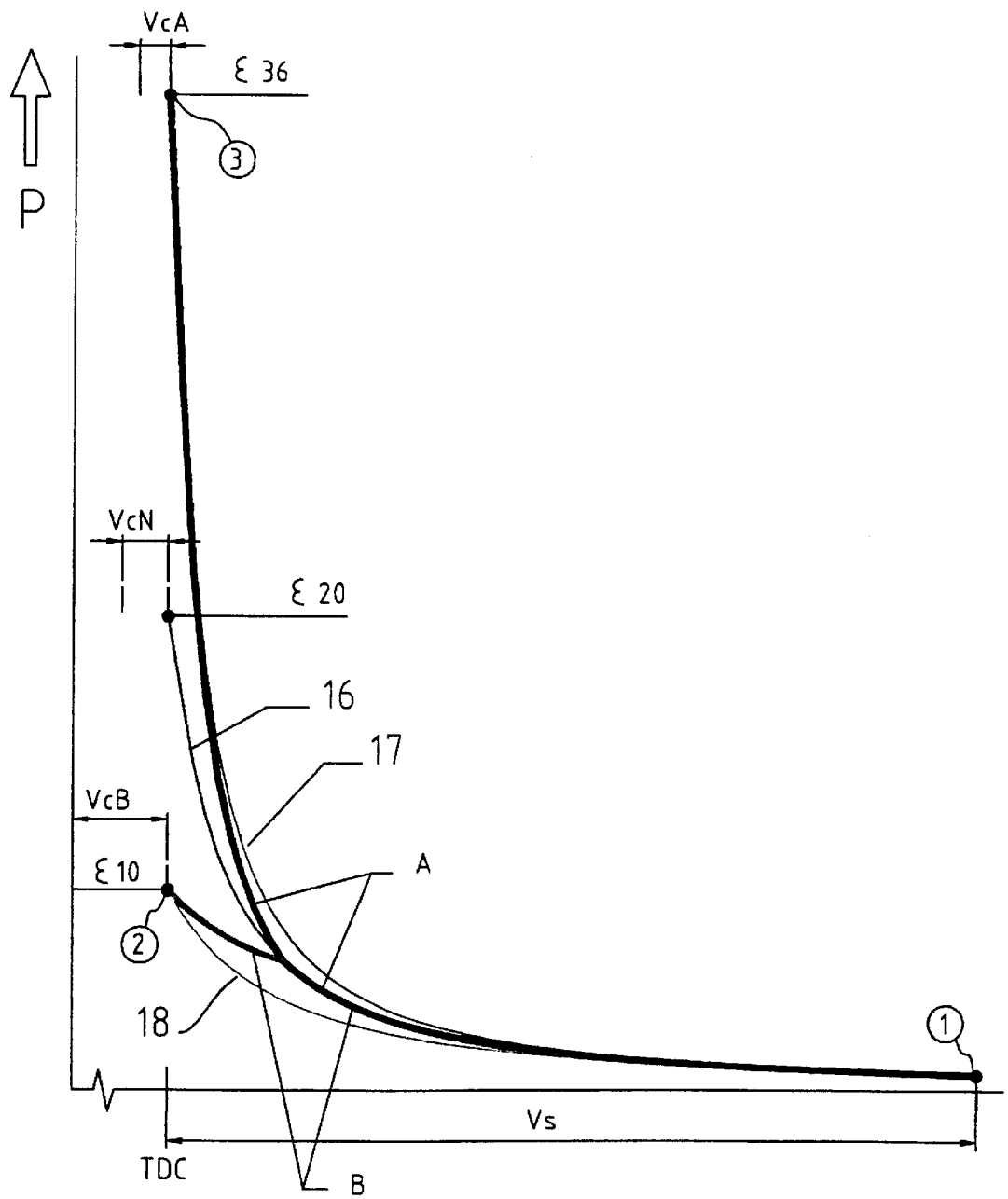
FIG. 7 is a pressure-volume diagram of the compression stroke of the working cycle of the second embodiment of the invention.
Figure 8:
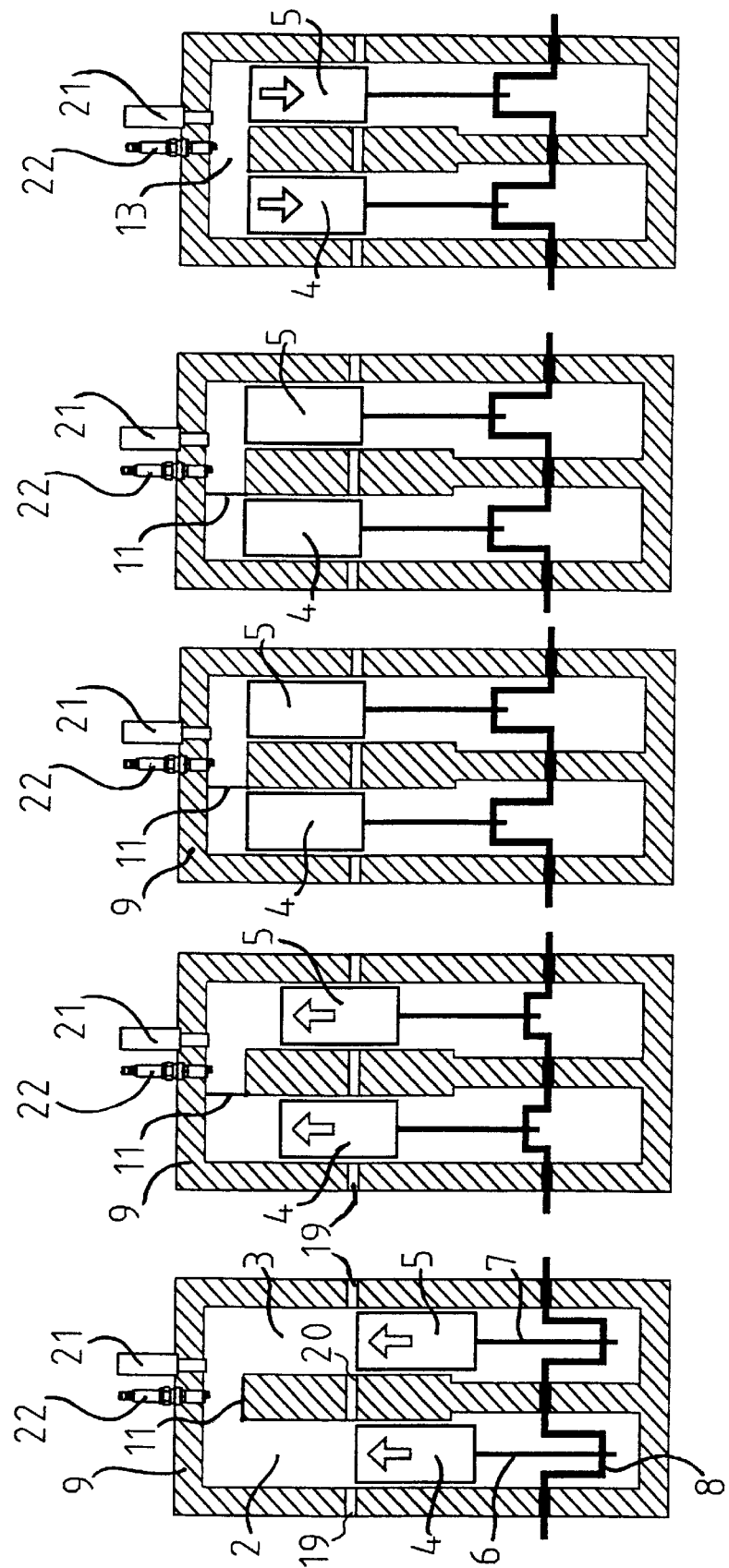
FIGS. 8a–e are highly schematic longitudinal sections through an engine working according to the working cycle of the second embodiment of the invention in different stages of the working cycle.

FIG. 7 shows a pressure-volume diagram of the compression stroke of the working cycle. Points 1, 2 and 3 are the same as before, but FIG. 7 shows an example where the compression ratio from point 1 to point 2 is $\epsilon=10$, whereas the compression ratio from point 1 to point 3 is $\epsilon=36$. There is also shown an imaginary curve 16, which represents the adiabatic compression to a compression ratio of $\epsilon=20$, which represents the nominal compression ratio of the engine when the compression ratios in points 2 and 3 are $\epsilon=10$ and $\epsilon=36$, respectively. These values apply to the example illustrated in FIG. 7, but depending on the physical configuration of the engine, a predetermined value of the nominal compression ratio may be achieved with other values of the compression ratios for process A and process B. Also shown in FIG. 7 are curves 17 and 18, which represent the adiabatic compression to compression ratio $\epsilon=36$ and $\epsilon=10$, respectively.

In FIGS. 8*a*–*e*, there is shown very schematically an internal combustion engine in which the working cycle according to FIGS. 4–7 is performed. The reference numerals used in FIGS. 8a–e are the same as used in FIGS. 3a–e, but extra numerals are used for elements not found in FIGS. 3a–e. Starting in FIG. 8a, pistons 4, 5 in cylinders 2, 3 are situated in a position to uncover inlets 19 and outlets 20, so that gas change can take place in the engine. The flap or valve 11 is open. From that point, there will be a common compression of the gas in cylinders 2, 3 during a portion if the stroke of pistons 4, 5 along the adiabat corresponding to the nominal compression ratio of the engine. When the pistons 4,5 reach the position shown in FIG. 8b, the flap 11 is moved to its closed position, so that their connection channel 10 is closed. From that point and up to the point shown in FIG. 8c, the gas portions in cylinders 2, 3 will be compressed separately to different compression ratios, as shown in FIGS. 4–7.

Fuel is then added to the gas in cylinder 3 above piston 5 by means of a fuel injector 21, whereupon the fuel-gas mixture is ignited by means of a spark plug 22.

Thereafter the valve 11 is opened, as shown in FIG. 8e, so that the gas portions will be mixed, in the compression volume corresponding to the nominal compression ratio of the engine and will then expand together, as show with the arrows.

When the expansion is completed, the pistons 4, 5 have reached a position to uncover the inlets 19 and the outlets 20, so that gas change can be performed again. Thereafter the sequence is repeated.

With reference to FIGS. 9–13a, a working cycle in an internal combustion engine will be described, and the engine according to these figures represent what is ideally possible to achieve in operation.

Figure 9:
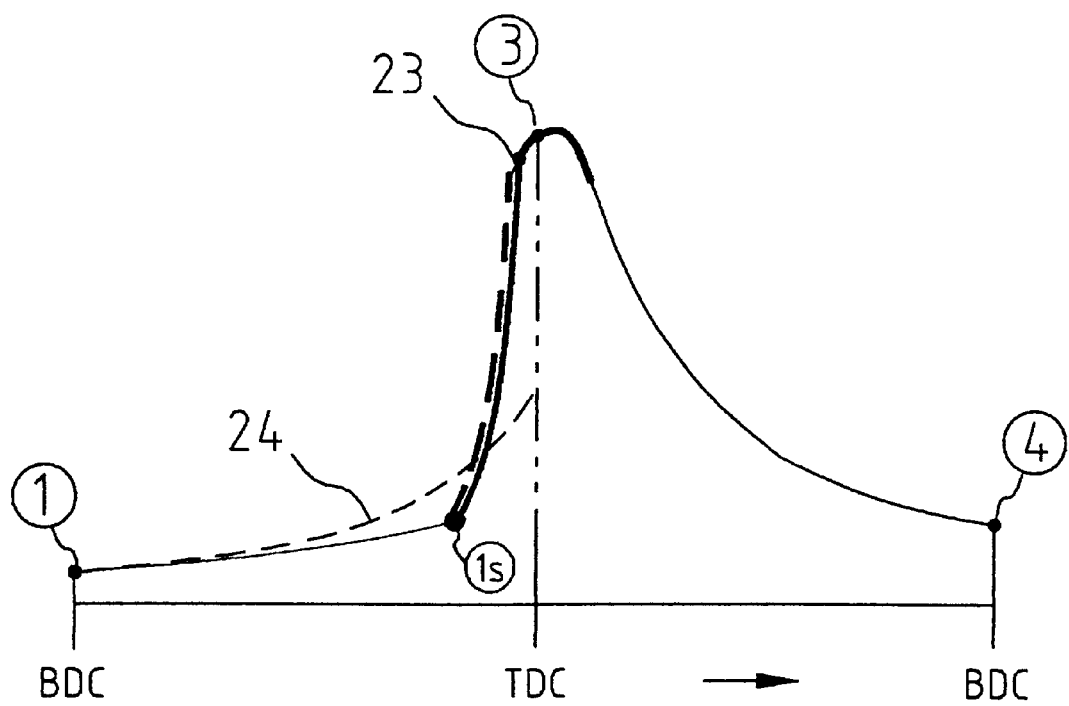
FIG. 9 is a pressure-crankshaft angle diagram for an engine in accordance with FIGS. 10–13a, FIGS. 10–13 show cross sections through an internal combustion engine according to the invention in different stages of the working cycle.

In FIG. 9, there is shown a pressure-crankshaft angle diagram over the working cycle of the engine of FIGS. 10–13a. As can be seen, there is first a common compression from bottom dead centre to the point 1s. Thereafter the gas is divided into two portions, one of which is compressed to a high compression ratio, whereas the other gas portion is provided with fuel that is ignited in order to raise the compression pressure at substantially the same rate as for the first gas portion. At a point shortly before top dead centre, designated 23 in FIG. 9 and called the release point, some gas from the highly compressed gas portion is allowed to flow into the second gas portion in order to enhance the mixture of gas and fuel, as will be described in more detail below. Also shown in FIG. 9 is a curve 24, which relates adiabatic compression according to the nominal compression ratio of the engine. The process after top dead centre is substantially as described above, i.e. the two gas portions are expanded together in order to produce work.

The engine illustrated in FIGS. 10–13a has an engine block 25 and a crankcase 25a. In the engine block 25 is inserted a cylinder liner 26, in which a piston 27 is movable up and down. The piston 27 is, by means of a connecting rod 28, connected to a crankshaft 29, which is running in bearings (not shown) in the engine block 25 and the crankcase 25a. An inlet 30 and an outlet 31 are arranged in the engine block 25 and the cylinder liner 26, but, for the sake of clarity, no inlet system or outlet system is shown, as they may be of conventional type and do not form any part of the invention. From the position of the inlet 30 and the outlet 31 it is clear that the engine is working according to the two-stroke working cycle.

In the upper end of the cylinder liner 26 there is a cylinder head 32 closing the upper end of the cylinder liner 26. In the cylinder head 32 there is indicated a fuel injector 33 for injecting fuel into the combustion chamber of the engine. It can also be seen from the drawings that the cylinder head 32 is an insert, which is inserted into the upper part of the engine block 25. Cooling passages 34 and 35 are arranged both in the cylinder head 32 and in the engine block 25 around the upper portion of the cylinder liner 26.

The upper surface of the piston 27 and the lower surface of the cylinder head 32 define, together with the peripheral wall of the cylinder liner 26, the combustion chamber 36. When the piston 27 is situated in its bottom dead centre as shown in FIG. 10, the combustion chamber 36 is connected to the inlet 30 and the outlet 31, so that gas change can be performed in the combustion chamber 36.

On its upper surface, which defines the combustion chamber 36, the piston 27 is provided with a protrusion 37. The protrusion 37 is coaxial to the piston 27 and substantially cylindrical and provided with a slightly concave upper surface 38. However, the surface 38 may have other shapes, e.g. flat or convex. The protrusion 37 is defined peripherally by a substantially cylindrical peripheral surface 39, and radially outside the peripheral surface 39 there is a ring shaped surface 40, which in the shown embodiment is shaped as a truncated cone having a large top angle. The protrusion 37 may, of course, be differently shaped. Its cross section shape may be other than circular-cylindric, and it may be placed differently from centrally on the piston 27. Further, the ring-shaped surface 40 may be flat or shaped in a different way.

The inside of the cylinder head 32 is formed with a cylindrical surface 41 and a ring-shaped surface 42 for cooperation with the peripheral surface 39 and the ring-shaped surface 40 of the piston 27, as will be described in more detail below. Above the ring-shaped surface 42, the cylinder head 32 is shaped with a recess 43, which is defined by the cylindrical surface 41 and the inside of the cylinder head 32 above the cylindrical surface 41. The fuel injector 33 extends into the recess 43.

Figure 10:
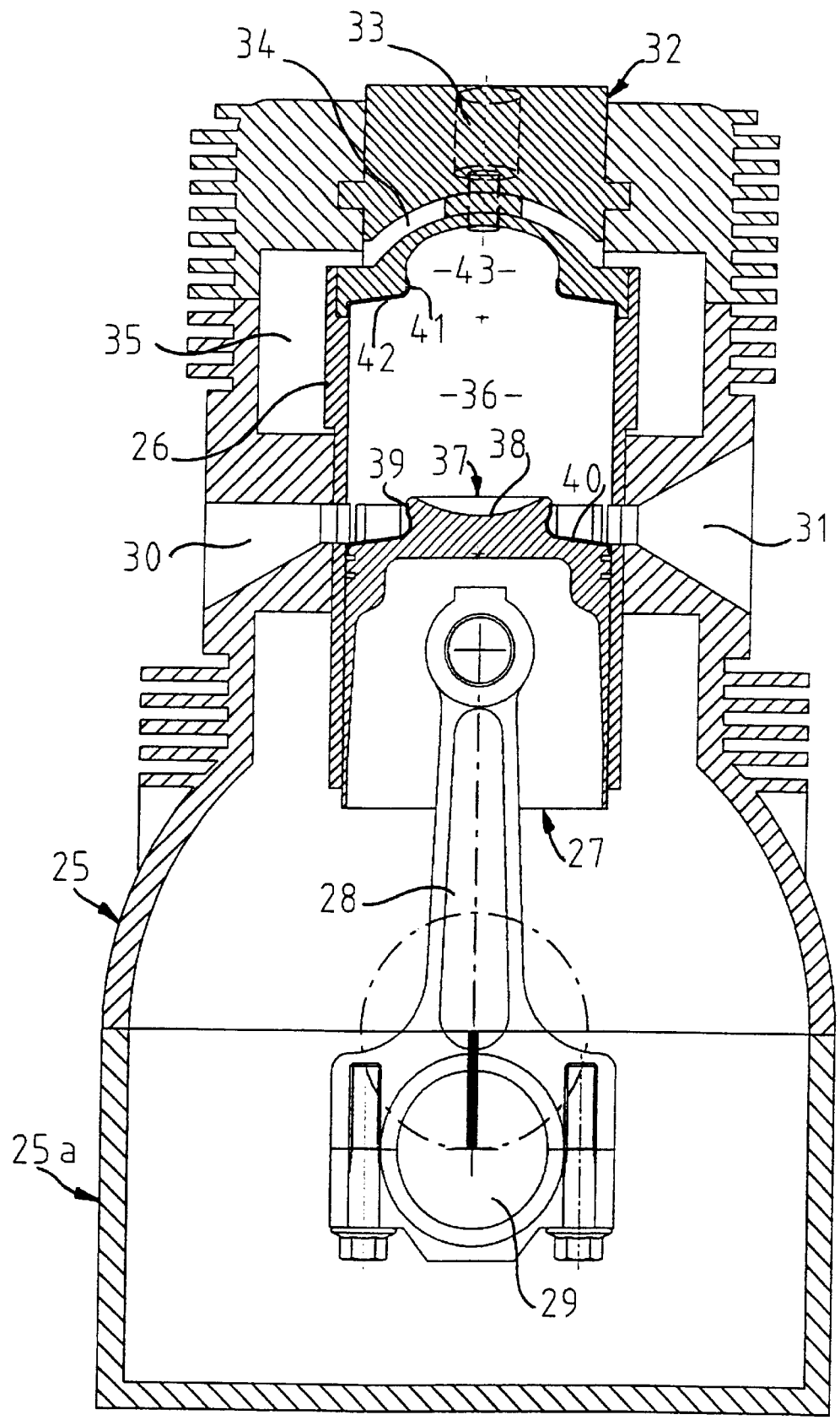
Figure 11:
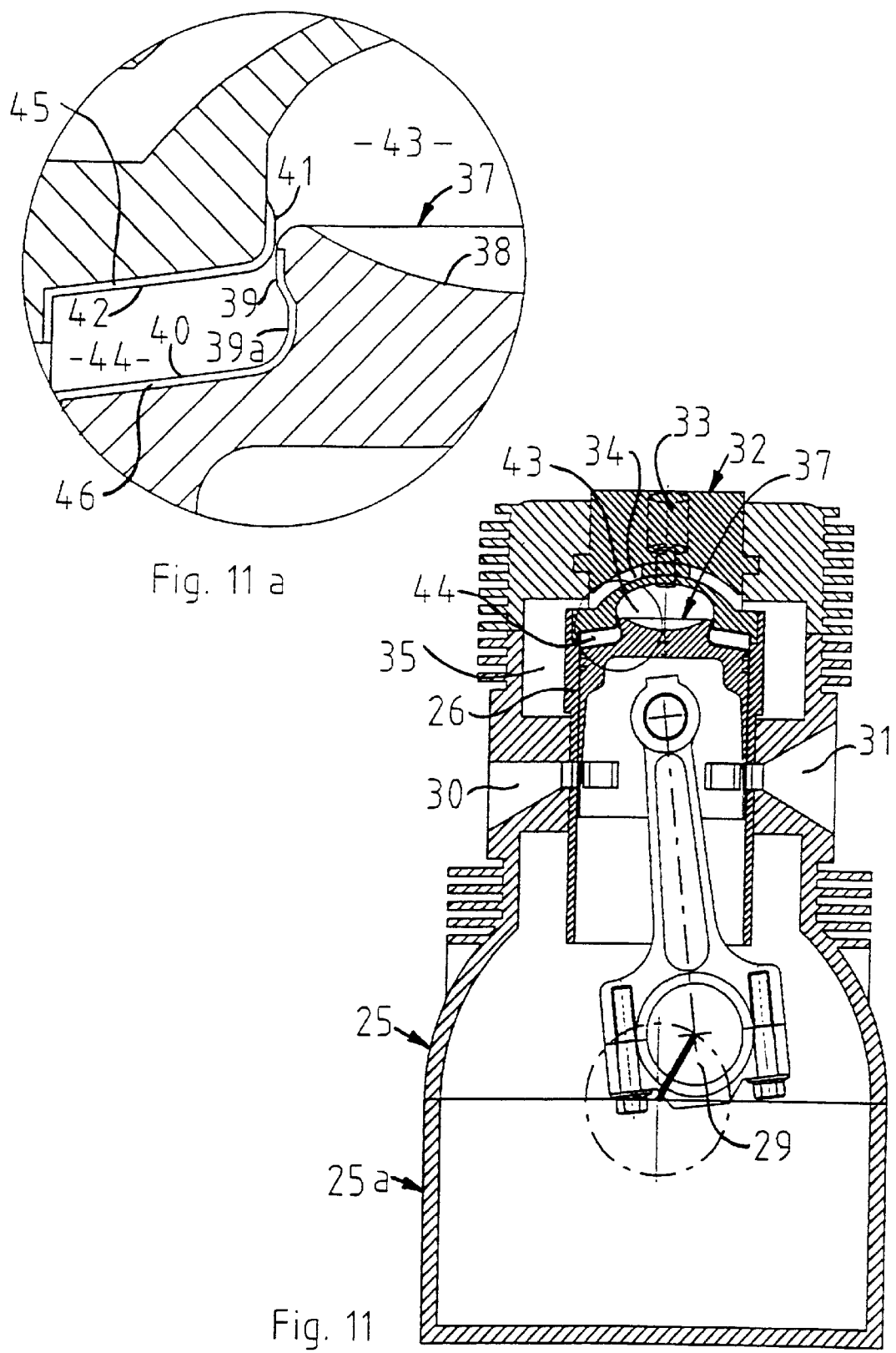
FIGS. 11a, 12a and 13a show enlarged portions of FIGS. 11, 12, and 13, respectively.

When the crankshaft 29 rotates from the position of FIG. 10, the piston 27 will be moved upwardly in the cylinder by means of the connecting rod 28. When the piston, after a short movement, has closed the inlet 30 and the outlet 31, the air present in the combustion chamber 36 will be compressed during the compression stroke. When the piston 27 has reached the position of FIG. 11, the protrusion 37 will begin to enter the recess 43 in the cylinder head 32. As can be seen in FIG. 11 and in more detail in FIG. 11a, the peripheral surface 39 of the protrusion 37 fits with a relatively small gap against the cylindrical surface 41 in the recess 43. This means that the combustion chamber 36 is divided into two portions, where one portion is the recess 43 and the other portion is a ring-shaped chamber 44 between the ring-shaped surfaces 40 and 42 (see FIG. 11a). It can also be seen that the inside of the cylinder head 32 along the surfaces 41 and 42 is provided with a protective coating 45, e.g. made of a heat-resistant material, such as a ceramic material. The reason for this is to make it possible to use higher temperatures during the operation of the engine. For the same reason, the ring-shaped surface 40 and the peripheral surface 39 of the piston 27 are provided with a protective coating 46. As can be seen from e.g. FIG. 11a, the protective coating 45 of the cylinder head extends a short distance down into the cylinder.

During continued rotation of the crankshaft 29, a further compression will take place. During this period the compression of the air in the recess 43 is relatively low in comparison with the compression of the air in the ring-shaped chamber 44.

Figure 12:
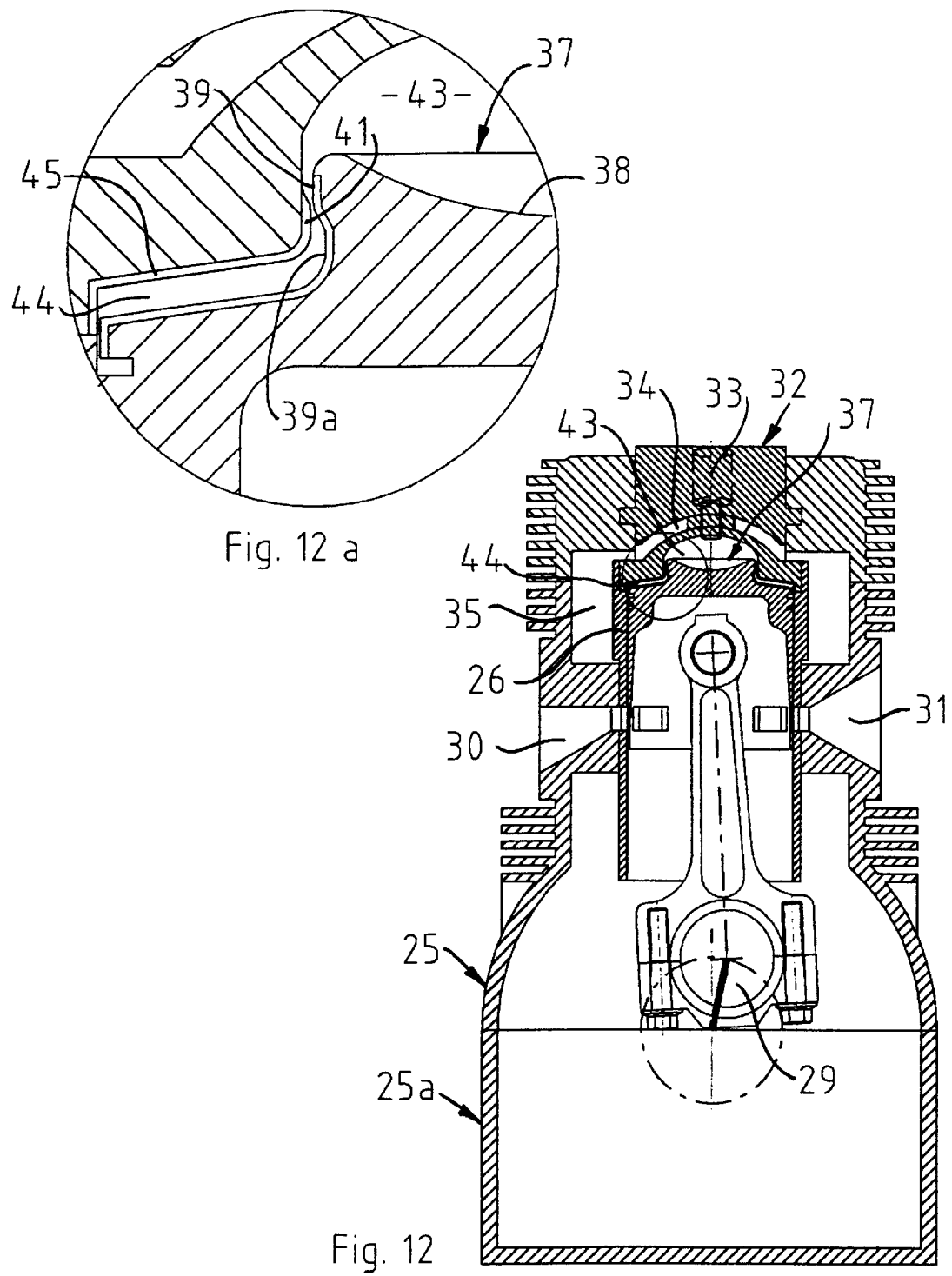

When the piston reaches the position shown in FIGS. 12 and 12a, and the crankshaft 29 continues its rotation, a narrow gap will be formed between the peripheral surface 39 and the cylindrical surface 41, due to the fact that the peripheral surface 39 has a portion 39a having a reduced diameter. This gap can be clearly seen in FIGS. 13 and 13a, which show the piston 27 in its top dead centre. This small gap 47 will allow some of the highly compressed gas in the ring-shaped chamber 44 to flow through the gap 47 and into the recess 43. In this way, some of the gas from the chamber 44, which is very highly compressed and very hot, may flow through the gap 47 into the recess 43 in order to enhance the combustion in recess 43. hi the position shown in FIGS. 13 and 13a, the combustion has already started in recess 43, and the piston 27 will start its downward motion under the influence of the pressure of the combustion gases in the recess 43.

Figure 13:
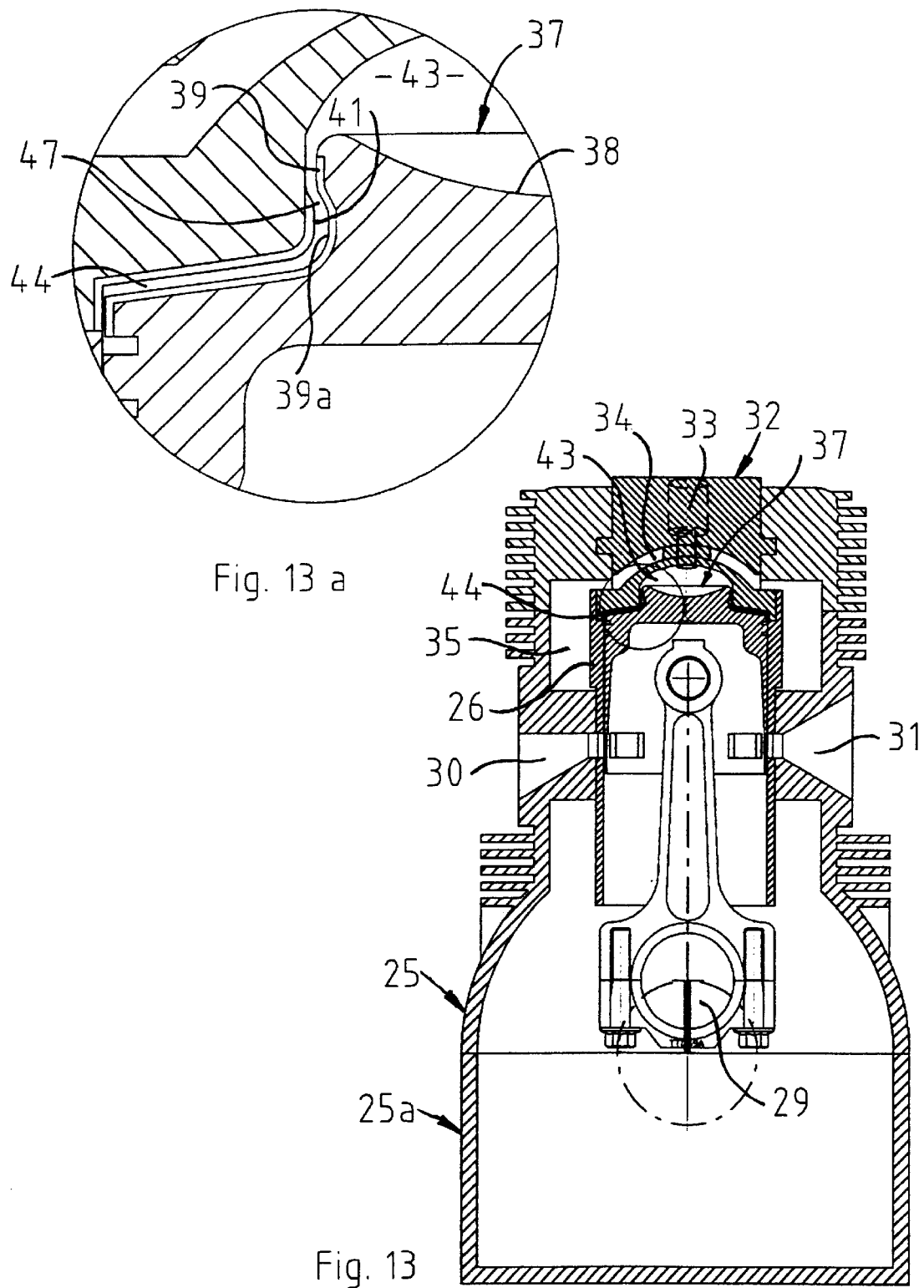

During the movement of the piston 27 from the position shown in FIGS. 13 and 13a, it will reach the positions shown in FIGS. 12 and 12a, and 11 and 11a, whereupon the remaining combustion and expansion will take place in all of the combustion chamber 36.

Figure 14:
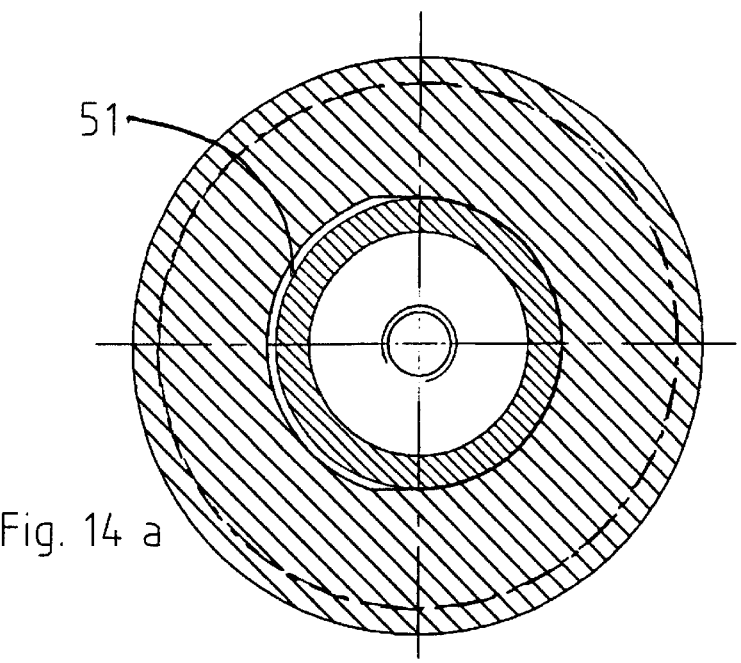
FIG. 14 shows a section through a modified embodiment of an engine according to the present invention, with the piston in its top dead centre position.
Figure 14:
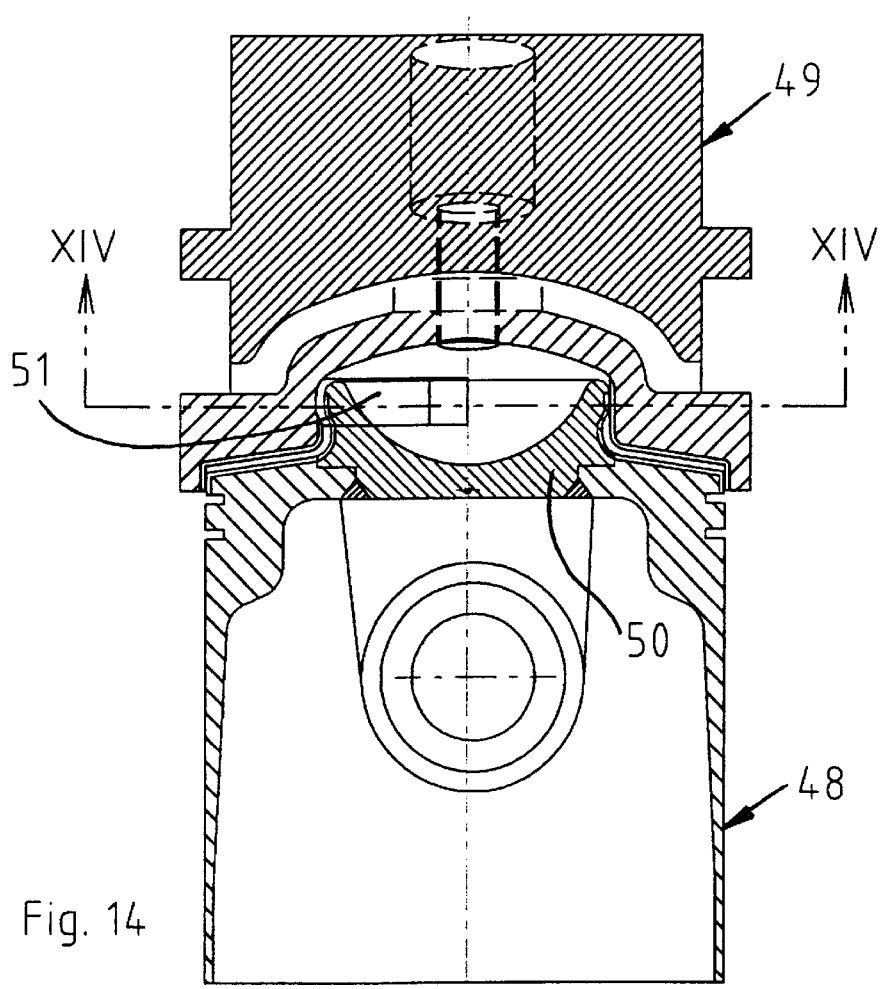
Figure 14:
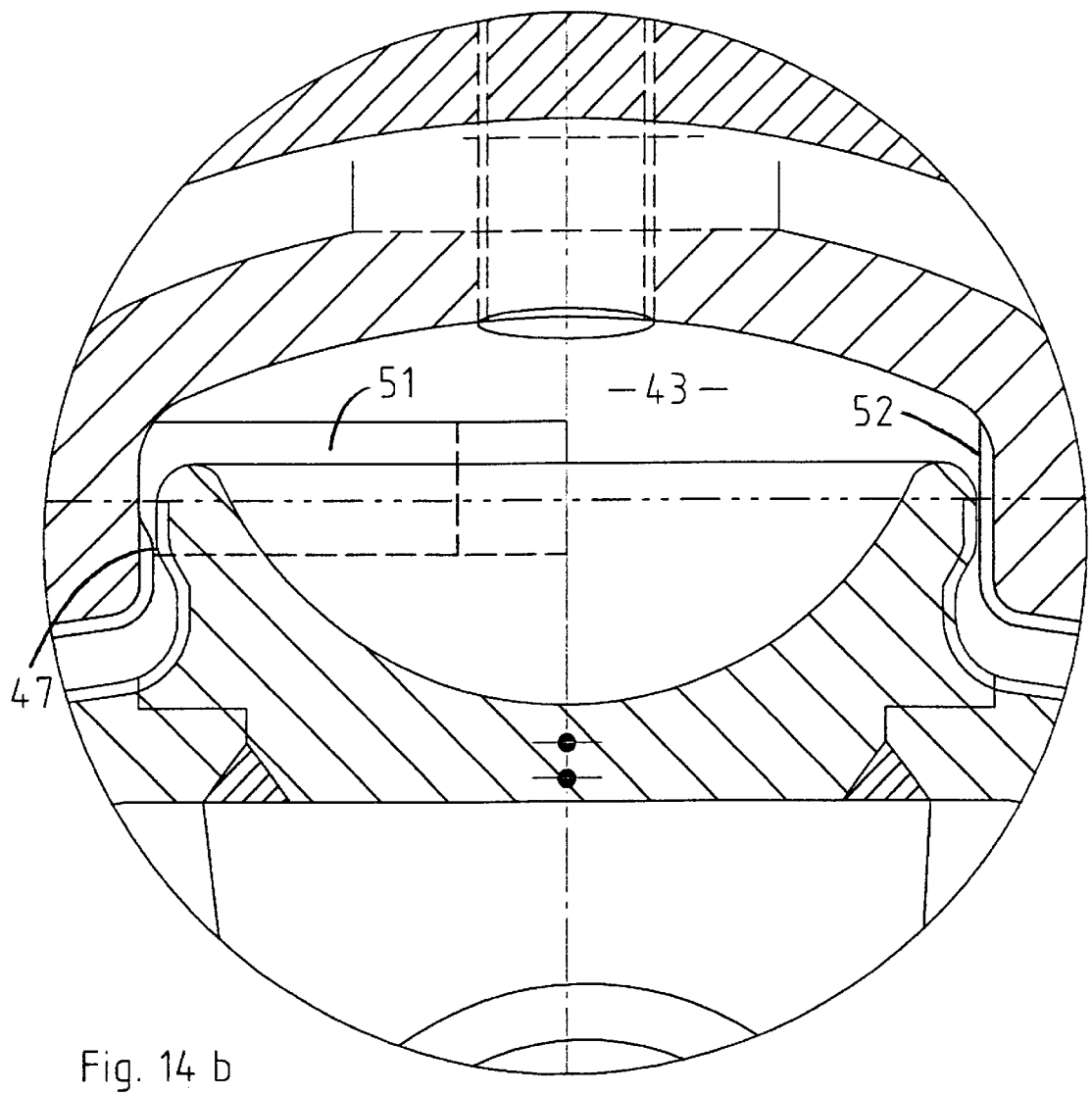

FIGS. 14, 14a, and 14b show a piston 48 and a cylinder head 49, which are slightly modified in relation to the corresponding parts according to FIGS. 10–13a. In the piston 48 the protrusion 50 is shaped as an insert that is welded into the crown of the piston. This makes it possible to use another material for the protrusion 50 and for the rest of the piston 48. Further, the cylinder head 49 is provided with a groove 51 which extends along a part of the cylindrical surface 52 and which is intended to create a guided flow of gas through the gap 47, described in connection with FIGS. 10–13a. In this way it is possible to further enhance the mixing of gas and fuel in the recess 43, in order to get a better combustion. By varying the shape and size of the groove 51 it is possible to create different flow patterns to suit different circumstances.

Figure 15:
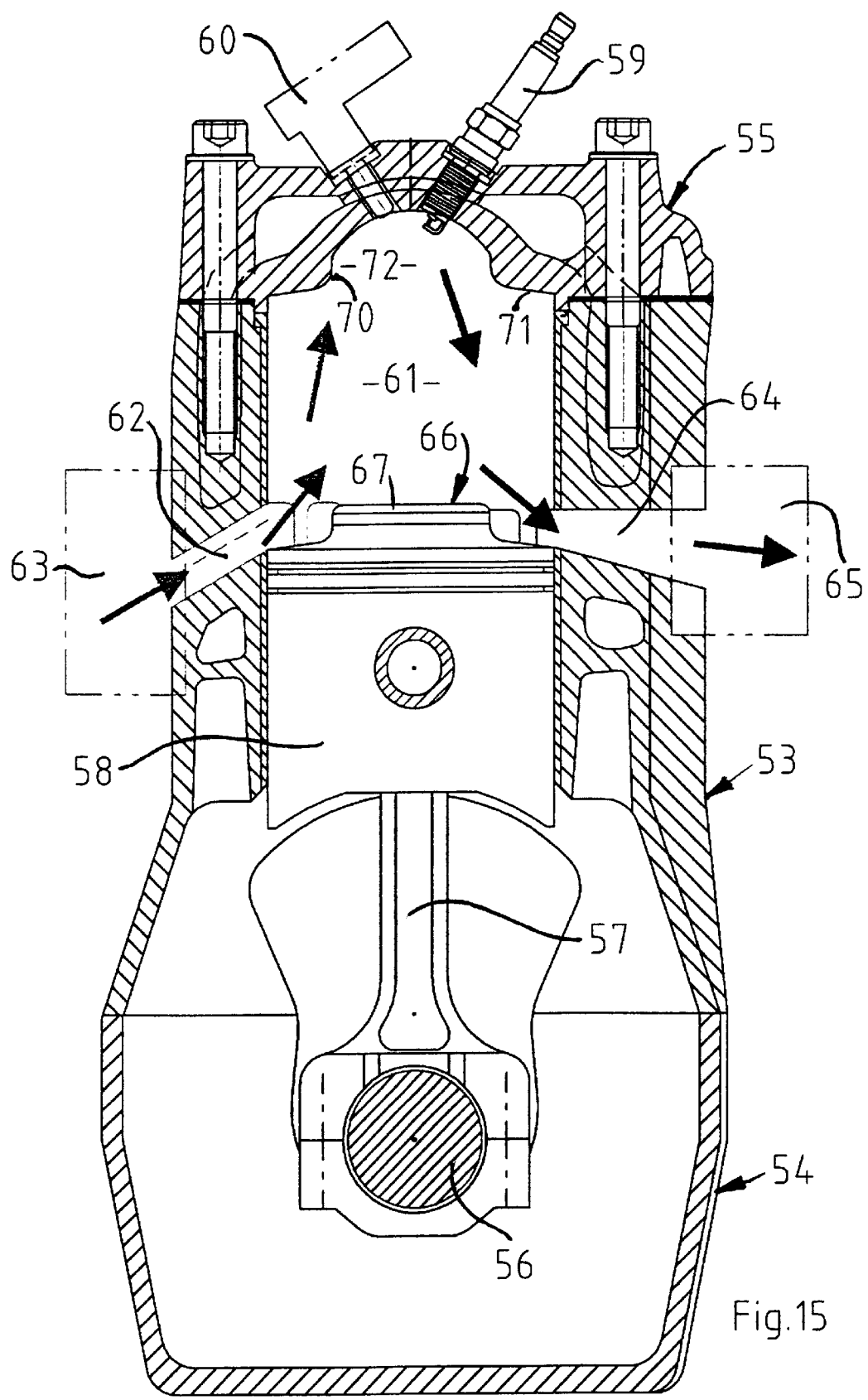
FIG. 15 shows a section through another internal combustion engine according to the invention, said engine being of the two-stroke type with spark ignition, at the beginning of the compression stroke.
Figure 16:
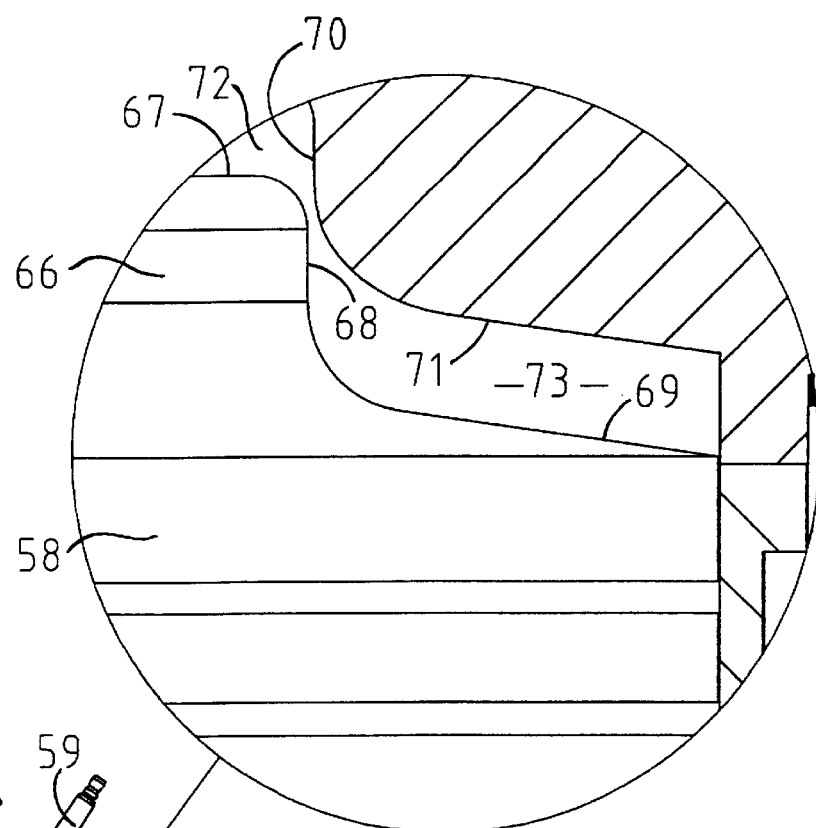
FIG. 16 shows a section corresponding to FIG. 15 but with the engine in a position during the last part of the compression stroke.
Figure 16:
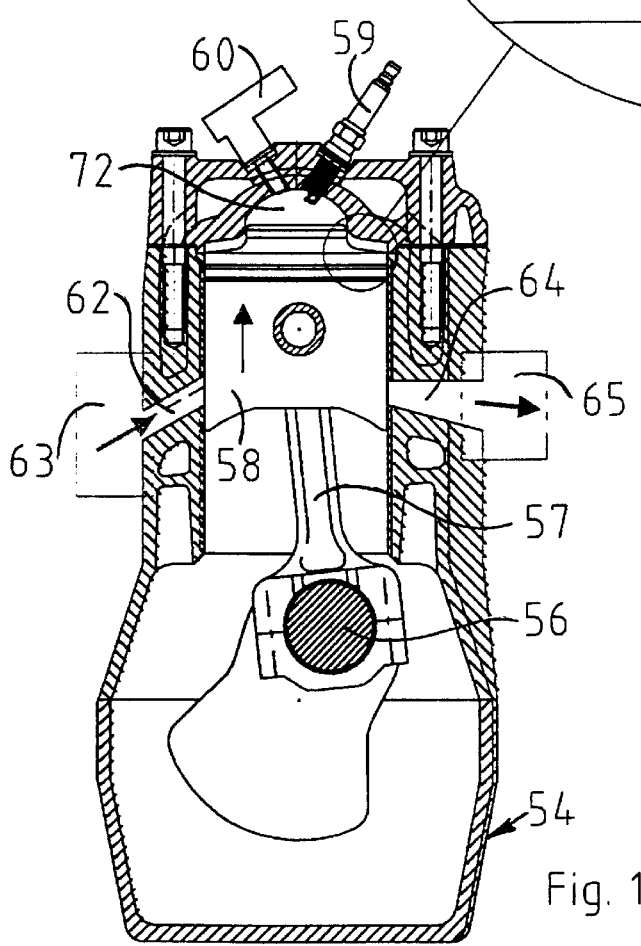

FIGS. 15, 16, and 16a show another embodiment of an internal combustion engine according to the invention. The engine includes an engine block 53, a crankcase 54 and a cylinder head 55. In the crankcase 54, a crankshaft 56 is rotatably supported. The crankshaft 56 carries a connecting rod 57, at the other end of which a piston 58 is arranged. The cylinder head 55 is provided with a sparkplug 59 and a fuel injector 60.

The upper surface of the piston 58 and the lower surface of the cylinder head 55 define, together with the peripheral wall of the cylinder, a combustion chamber 61. When the piston 58 is situated in its bottom dead centre, as shown in FIG. 15, the combustion chamber 61 is connected by an inlet channel 62 to an air supply device 63 and by an outlet channel 64 to an exhaust system 65.

The upper surface of the piston 58 is provided with a protrusion 66, which is coaxial to the piston 58 and is provided with a substantially flat upper surface 67. The protrusion 66 is defined peripherally by a substantially cylindrical peripheral surface 68, and radially outside this surface there is a ring-shaped surface 69, which in the embodiment shown is shaped as a truncated cone having a large top angle.

The inside of the cylinder head 55 has a cylindrical surface 70 and a ring-shaped surface 71 for cooperation with the peripheral surface 68 and the ring-shaped surface 69 of the piston 58. Above the cylindrical surface 70 the cylinder head 55 has a recess 72 into which the sparkplug 59 and fuel injector 60 extend.

When the crankshaft 56 rotates from the position of FIG. 15, the piston 58 will be moved upwardly in the cylinder by means of the connecting rod 57. When the inlet channel 62 and the outlet channel 64 have been closed by the piston, the air present in the combustion chamber 61 will be compressed. When the piston 58 has reached the position of FIG. 16, the protrusion 66 will begin to enter the recess 72 in the cylinder head 55. As can be seen in FIG. 16 and in more detail in FIG. 16a, the peripheral surface 68 of the protrusion 72 fits with a small gap against the cylindrical surface 70 in the recess 72. This means that the combustion chamber 61 is divided into two portions, where one portion is the recess 72 and the other portion is a ring-shaped chamber 73 between the ring-shaped surfaces 69 and 71.

During continued rotation of the crankshaft 56, a further compression will take place until the piston reaches its top dead centre. During this period the compression of the air in the recess 72 is relatively low in comparison with the compression of the air in the ring-shaped chamber 73. As an example, the compression ratio for the air in the recess 72, from the position according to FIGS. 6 and 6a to the top dead centre of the piston 58, may be 1.3, while the compression ratio for the air in the ring-shaped chamber 73 during the same period may be 5.

When the piston 58 has reached top dead centre, or shortly before this position, fuel is injected into the recess 72 by means of the fuel injector 60, whereupon the fuel-air mixture is ignited by means of the sparkplug 59. After this the process will be substantially the same as described above with reference to FIGS. 10–13a, with the exception that, as the peripheral surface 68 has no portion with reduced diameter, there will be no or very little flow of air from the ring-shaped chamber 73 to the recess 72.

Reference is then made to FIGS. 17 and 17a, which show parts of an internal combustion engine of the four-stroke type, which means that the engine includes and inlet valve 74 and an outlet valve 75. It should also be noted that in this embodiment the location of the recess and the protrusion has been exchanged. In this embodiment the piston 76 is provided with a recess 77, while the cylinder head 78 is provided with a protrusion 79. This shows that an engine of the four-stroke type is possible in accordance with the invention, and FIGS. 17 and 17a also show that the piston may have the recess while the cylinder head is provided with the protrusion. The function and the working cycle of the engine according to this embodiment is analogue to what has been described previously in relation to FIGS. 10–16.

Figure 18:
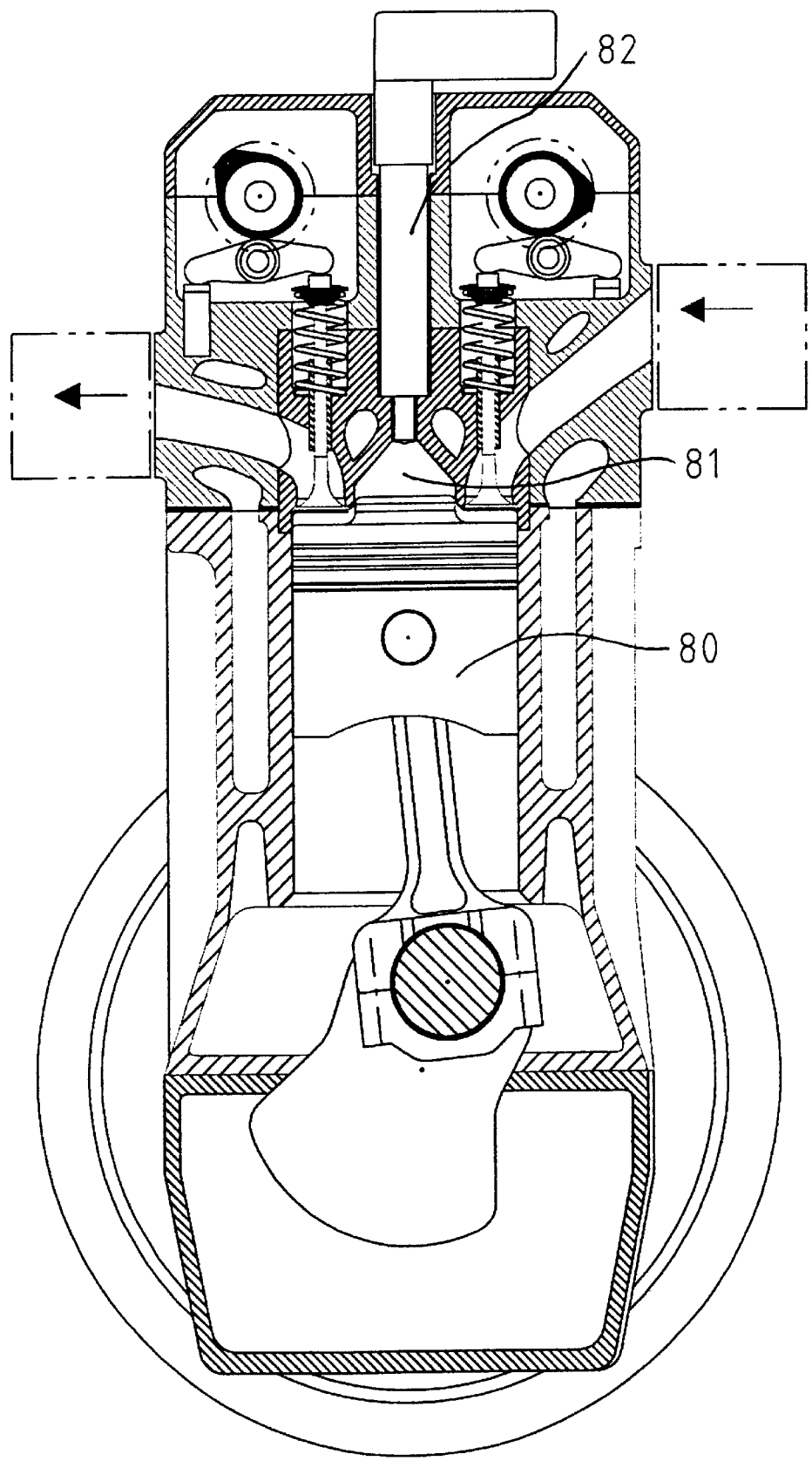
FIG. 18 shows a cross section through a modified four-stroke engine according to the invention.

FIG. 18 shows an internal combustion engine of the four-stroke diesel type. In this case, the upper surface of the piston 80 is flat and the recess 81 has a conical shape. A fuel injector 82 extends into the recess 81, and in this case the compression ratio has been chosen comparatively high so that the pressure and temperature after compression in the recess 81 is high enough to cause self-ignition in the recess 81.

Figure 19:
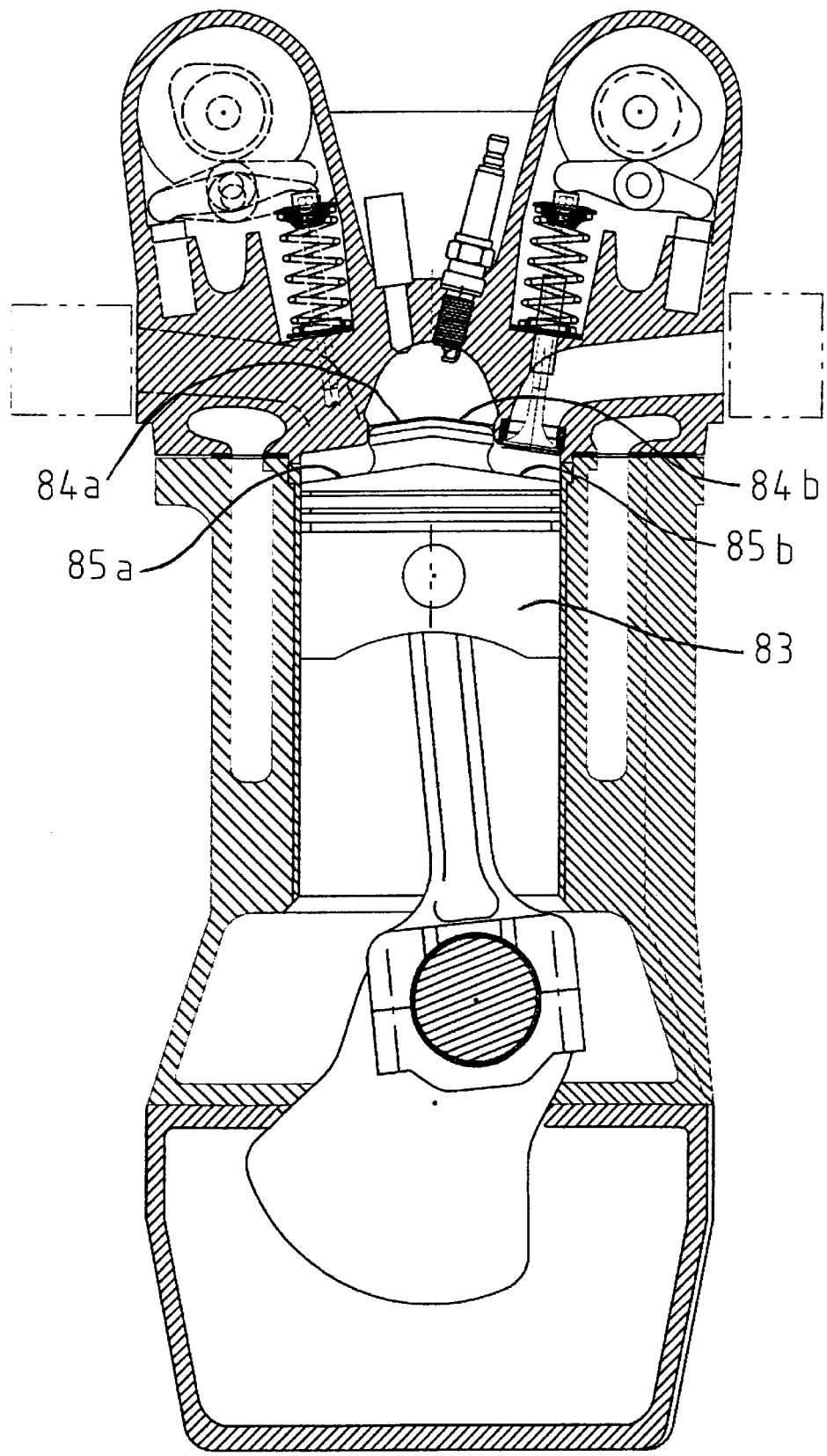
FIG. 19 shows a cross section through a further modified four-stroke engine according to the invention.

FIG. 19 shows a further modified internal combustion engine according to the invention. This engine is of the four-stroke Otto-type, and in this embodiment the piston 83 has an upper surface consisting of different parts. The upper surface of the protrusion 84 consists of two surfaces 84a and 84b, which are flat surfaces that are inclined to each other. In a similar manner the ring-shaped surface 85 surrounding the protrusion 84 consists of two flat portions 85a, 85b, which are inclined in relation to each other. Otherwise the engine shown in FIG. 19 corresponds closely to the engines described above, and also the working cycle performed in the engine according to FIG. 19 corresponds to the working cycle performed in the engines according to the previously described embodiments.

The invention is not restricted to what is described above, but the skilled person may modify the invention within the scope of the appended claims.

What is claimed is:

1. A working cycle for a heat engine, especially of the reciprocating piston type, said engine having a gas as working medium, said working cycle including the following steps:

isentropic compression of the gas, isochoric addition of heat to the gas, isentropic expansion of the gas, isochoric return of the gas to its initial condition, characterized in that the gas before or during the compression is divided into a first and a second portion, that said gas portions are compressed to different degrees, that the addition of heat is performed only or mainly to the gas portion compressed to the lowest degree, whereafter the two gas portions are brought into connection with each other and are expanded together.

2. A working cycle for an internal combustion engine of the reciprocating piston type and having a combustion chamber and a cylinder head, characterized by the following steps:

admittance of a mass of gas to the combustion chamber, division of the gas into a first and a second portion, compression of the first portion of the gas to a first predetermined compression ratio, compression of the second portion of the gas to a second, higher compression ratio, introduction of a predetermined amount of fuel into the first portion of the gas, ignition of the fuel in the first portion of the gas, connection of the first and the second portion of the gas, expansion of the first and the second portion of the gas together, and discharge of the expanded gas from the combustion chamber.

3. A working cycle for a heat engine accordingly to claim 1, characterized in that the nominal compression ratio $\epsilon$ of the engine is $$\epsilon = (V_{CA} + V_{CB} + V_{SA} + V_{SB})/(V_{CA} + V_{CB}), \text{ where}$$

$V_{CA}$=the compression volume of the first gas portion, $V_{CB}$=the compression volyme of the second gas portion, $V_{SA}$=the stroke volume of the first gas portion, and $V_{SB}$=the stroke volume of the second gas portion.

4. A working cycle according to claim 1, characterized in that the division of the mass of gas into a first and a second portion is performed after a primary compression of the whole mass of gas.

5. A working cycle according to claim 2, characterized in that fuel is intro-duced into the first portion of the gas during the last part of the compression and/or the first part of the expansion.

6. A working cycle according to claim 4, characterized in that the division of the mass of gas is performed when the piston has reached a predetermined position in the cylinder.

7. A working cycle according to claim 2, characterized in that during the last part of the compression a connection between the two portions of the gas is opened, said connection having a restricted cross section area.

8. A working cycle according to claim 7, characterized in that the cross section area of the connection is varied in dependence of the position of the piston in the cylinder.

9. An internal combustion engine of the reciprocating piston type, in which the piston defines a combustion chamber together with the walls of the cylinder, in which the piston is reciprocatingly movable, and a cylinder head closing one end of the cylinder, characterised in that the combustion chamber is provided with means for dividing the combustion chamber into two parts giving different compression ratios, so that a gas in the combustion chamber is divided into two portions compressed to different degrees when the piston performs a compression stroke in said cylinder, and in that at least one fuel injector is adapted to provide fuel only or mainly to the gas portion compressed to the lowest degree.

10. An internal combustion engine according to claim 9, characterised in that means for introduction of fuel and means for igniting the fuel are arranged in the part of the combustion chamber having the lowest compression ratio.

11. An internal combustion engine according to claim 9, characterized in that the end surface of the piston on the combustion chamber side or the cylinder head is provided with a protrusion for cooperation with a recess in the surface of the cylinder head or the piston in order to divide the combustion chamber into two portions, the cross-sectional dimensions of the protrusion and the recess being such that the protrusion fits inside the recess with a predetermined clearance between the two.

12. An internal combustion engine according to claim 9, characterized in that the protrusion and the recess are positioned substantially centrally on or in the piston and the cylinder head.

13. An internal combustion engine according to claim 9, characterized in that the height of the protrusion in the direction of the axis of cylinder is substantially less than the corresponding height of the recess.

14. An internal combustion engine according to claim 9, characterized in that the end surface of the protrusion is substantially flat.

15. An internal combustion engine according to claim 9, characterized in that the end surface of the protrusion is provided with a cavity.

16. An internal combustion engine according to claim 9, characterized in that the protrusion and the recess are substantially circular in cross section.

17. An internal combustion engine according to claim 9, characterized in that the piston has a ring-shaped surface surrounding the protrusion or the recess, said ring-shaped surface preferably being substantially frusto-conical having a large top angle.

18. An internal combustion engine according to claim 17, characterized in that the cylinder head has a ring-shaped surface surrounding the recess or the protrusion, said ring-shaped surface preferably being substantially frusto-conical having a large top angle.

19. An internal combustion engine according to claim 9, characterized in that the piston and the cylinder head has a ring-shaped surface surrounding the protrusion and the recess, respectively, said ring-shaped surfaces comprising two substantially flat sub-surfaces that are inclined at a large angle to each other.

20. An internal combustion engine according to claim 9, characterized in that the cylinder head is provided with an insert carrying a protrusion and being made of a material having high heat-resistance properties, and low thermal conductivity.

21. An internal combustion engine according to claim 20, characterized in that the insert in the cylinder head is provided with a collar that extends into the cylinder and forms the upper portion of the wall of the cylinder.

22. An internal combustion engine according to claim 20, characterized in that the insert in the cylinder head is uncooled or arranged for cooling only in a limited amount.

23. An internal combustion engine according to claim 9, characterized in that the upper part of the piston including the recess or the protrusion is made of a material having high heat-resistance properties and low thermal conductivity.

* * * * *